UNITED STATES PATENT OFFICE.

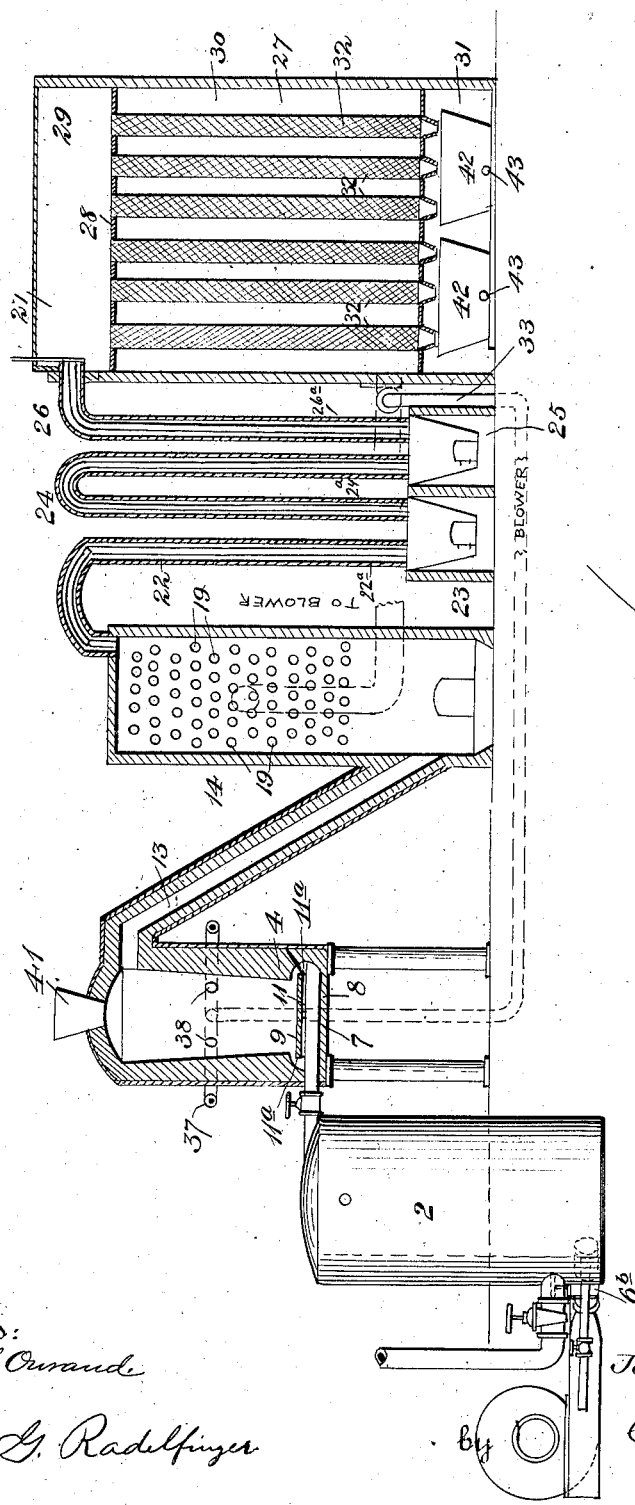

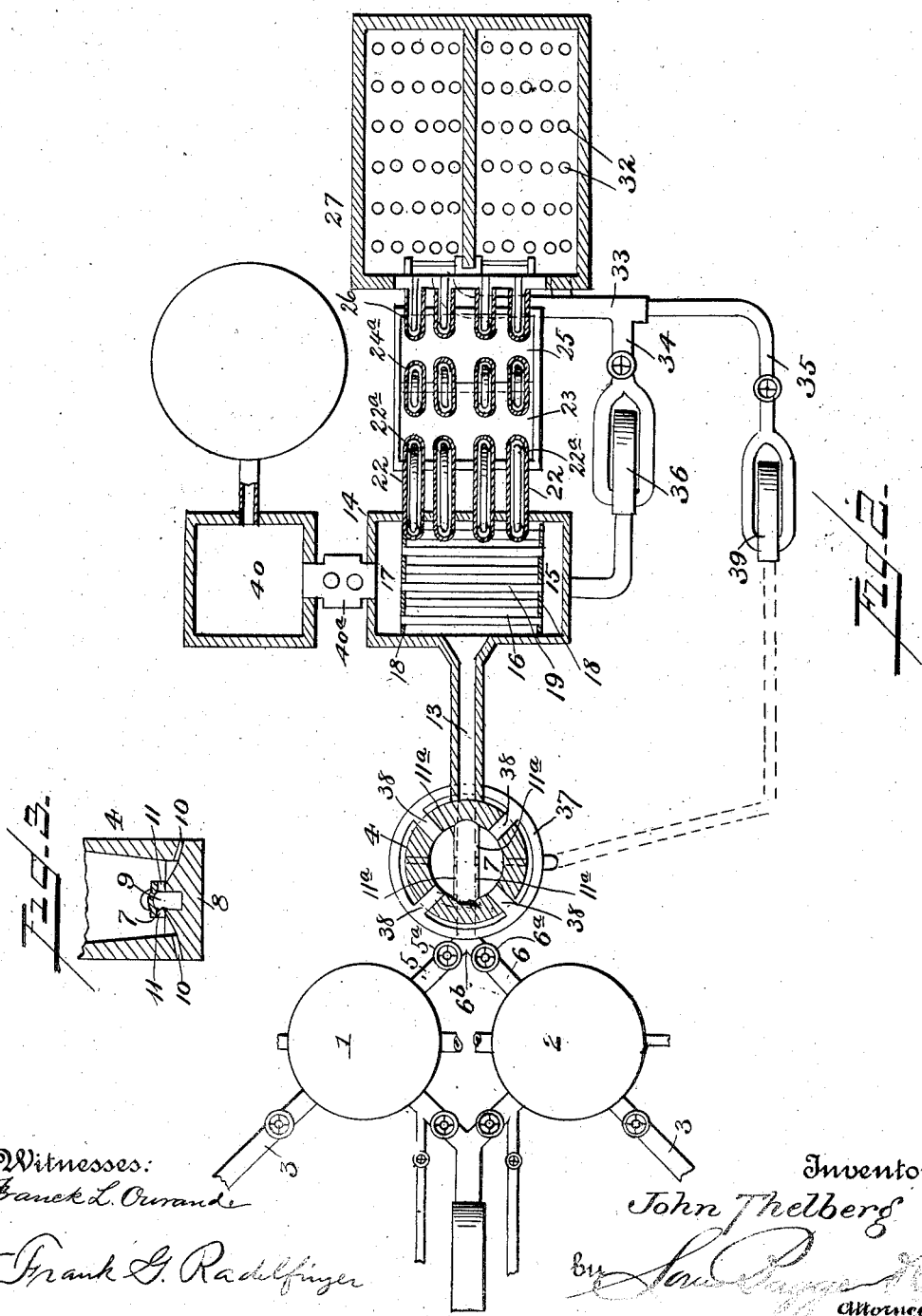

JOHN THELBERG, OF NEW YORK, N. Y.

PROCESS OF TREATING ZINC AND LEAD ORES.

No. 851,187.      Specification of Letters Patent.      Patented April 23, 1907.

Application filed July 16, 1902. Renewed August 23, 1906. Serial No. 331,801.

*To all whom it may concern:*

Be it known that I, JOHN THELBERG, a citizen of the United States, residing at New York, in the county of New York and State of New York, have invented new and useful Improvements in Processes of Treating Zinc and Lead Ores, of which the following is a specification.

Zinc and lead ores containing sulphur treated for the purpose of producing the volatile oxides and their combinations, of the metals contained in the ore, in a marketable state, are now commonly treated by mixing the coarsely powdered ore after previous full or partial roasting, with flux, which when lime is needed, consists of limestone (carbonate of lime) and coal or coke. The combustion is sustained by an air blast. The air, before passing through, the tuyeres into the furnace, is slightly heated by forcing it through an air space, formed by a jacket over the top of the furnace. The volatilized metallic oxides pass through an opening in the top of the furnace together with ashes, sulphur dioxide, nitrogen, carbon dioxide, ammonia, etc., through a flue into a settling and cooling room, where the ashes are separated from the sublimed oxides, and gases, which are then passed through cooling pipes into so-called "bag rooms," where the impure oxides are deposited and separated from the gases, which latter, including sulphur dioxide are disposed of through so-called "scrubbers" or a tall chimney.

The faults of the methods like the one outlined above for the manufacture of zinc and lead pigment direct from the ores by oxidation, sublimation, etc. which I obviate and eliminate by my invention are:

*a—The necessity of previous fine crushing and roasting of the ore.*

*b—The large loss of zinc in the slag.* The slag from above mentioned furnaces, usually contains 15% more or less of zinc. By allowing the slag to collect in the furnace and to run over and immerse part of the ore, quantities of the ore are dissolved by the slag, and carried off without being oxidized, which means loss of the sulphuret dissolved; and it has also been found in the analyses of slag from these furnaces that zinc as oxide is carried away suspended in the slag, showing that the slag itself and the bottoms of these furnaces do not possess the necessary temperature for the volatilization of the zinc oxid.

*c—The mixing of coal, coke or other fuel with the ore in the furnace;* the result of which is that part of the recovered oxides are mixed with ashes, etc. and the remainder contaminated with sulphides, soot, and other products of a more or less imperfect combustion, which make a further refining of the pigment necessary before it is marketable.

*d—The results of contamination and dilution of the gases by carbon dioxide and other products of combustion of the added fuel, and the extra amount of nitrogen left from the air needed for the combustion of the fuel.* By the necessity of adding fuel to the ore in the furnace there is obtained, after the volatile metallic oxides have been separated from the gases, a mixture of sulphur dioxide, nitrogen, and gases of combustion of fuel, containing a large percent. of carbon dioxide which makes the sulphur dioxide in this mixture unfit for the manufacture of sulphuric acid.

*e—The deleterious effects of the presence of elements of reduction in a process which should be simple oxidation.* In processes where fuel is used in the furnace, free carbon, carbon monoxide, and carbon dioxide being present, there are mixed reactions going on resulting in loss of heat, and uncertain and undesirable products that interfere with the proper working of the furnace, making it extremely difficult to obtain a uniform product, which product finally has to pass through a refining process under a comparatively high temperature, the management of which requires great care and experience to yield a final product in a marketable state.

*f—The clogging of the flues from the furnace by the sintering of the ashes, etc.* which in plants now in operation have to be cleaned out at frequent intervals, necessitating cooling down of the furnace and plant connected with it.

To obviate the above, and, other objectionable features of the methods now in use, I have invented the following process for the treatment of zinc and lead ore containing sulphur, with the view, in an economical manner, to directly convert the zinc and lead contained in the ores into marketable pigment, and the sulphur into commercial sulphuric acid.

My invention consists of a process in which a superheated mixture of steam and air of a temperature preferably about 2,000° Fah. is introduced beneath and into a body of sulphid ore, containing zinc and lead or both preferably in lumps and mixed with the necessary flux, which if lime is needed, consists of quick lime, (CaO) and not as the custom is of lime stone (CO CO₃) without the addition of fuel of any description to the ore. I use quick lime instead of lime stone, so as not to produce and mix with the fumes and gases any carbon dioxide, but after the separation of the pigment to obtain the mixture of sulphur dioxide and nitrogen, practically free from carbon dioxide.

The novel mechanism employed by me in carrying out my invention is fully described in this specification, but not claimed and illustrated in the accompanying drawings forming a part thereof in which:

Figure 1 is a vertical longitudinal section of my apparatus. Fig. 2 is a horizontal section of the same. Fig. 3 is a detail of the bottom of the cupola.

Like numerals of reference designate like parts in the different views of the drawings.

The numerals 1 and 2 designate heat accumulators which are arranged to be heated, and are each connected at the bottom by pipes 3 to some source of steam and air under pressure. These accumulators 1 and 2 are connected by pipes 5 and 6, respectively, to a pipe 6ᵇ connected to a flue 7 in the bottom of a furnace 4. Valves 5ᵃ and 6ᵃ are mounted in pipes 5 and 6, respectively. By this arrangement it is possible to employ one accumulator for superheating the mixture of steam and air while the other is being heated.

The flue 7 extends transversely of the bottom 8 of the furnace and constitutes part of the bottom of the cupola furnace, and forms a ridge 9 from which the bottom 8 slopes on each side toward the inner ends of two downwardly inclined slag discharge openings 10. These openings enable the furnace to be drained of all slag. The openings 11ᵃ in the flue 7 at or near the center of the bottom 8 of the furnace 4 are preferably so constructed that they will spread and direct the air current slightly downward to follow the bottom of the furnace in the direction of the slag discharge holes 10, 10 on their respective sides, and longitudinal openings 11, 11 preferably curved to the line of the bottom of the furnace, one at each end of the ridge 9 or highest part of the bottom of the furnace, close to the wall, preferably so constructed that they direct the air current from the sides horizontally toward the center, spreading towards the sides and parallel with the bottom.

Connected to the cupola 4 at a point near the top, is a flue 13, which extends downwardly and is connected at its lower end to a chamber 14. The chamber 14 comprises three compartments 15, 16, and 17. The compartment 16 is located intermediate to the compartments 15 and 17, which are separated by vertical partitions 18. Pipes 19 connect the chambers 15 and 17 and traverse the chamber 16. These pipes serve to impede the movement of the particles of ore dust, and thereby precipitate them to the bottom of the chamber 16. These pipes 19 also serve to conduct gases from the chamber 15 to the chamber 17 as will appear.

A series of curved cooling pipes 22 are connected at one end to the top of the chamber 14 and at their other ends to a receptacle 23. A series of inverted U-shaped cooling pipes 24 are also connected to the receptacle 23 and to a receptacle 25. A third series 26 of cooling pipes are connected with the receptacle 25 and to the top of the chamber 27. The pipes 22, 24 and 26 are all provided with water jackets 22ᵃ, 24ᵃ and 26ᵃ, respectively. The chamber 27 is what is commonly termed a bag room and is divided by horizontal partitions 28 into three compartments 29, 30 and 31. The upper compartment 29 and the lower compartment 31 are connected by porous bags 32 which traverse the chamber 30. Receptacles 42 are placed in the compartment 31, and serve to catch any precipitate falling through the bags 32.

A pipe 33 is connected to the compartment 30 and divides into two branches 34 and 35. The branch 34 extends up to the chamber 14 and is connected through the compartment 15. A blower 36 is connected in the pipe 34 and serves to accelerate the movement of the gas through the pipe. The branch 35 extends up to the cupola 4 and is coupled to a curved pipe 37 which is connected to four tuyeres 38 passing through the walls of the cupola 4 at a point above the oxidation zone of the furnace. A blower 39 is coupled to the pipe 35 to accelerate the circulation.

A pipe 40ᵃ is connected to the compartment 17 and establishes communication with a Glover acid tower 40 where the sulphur dioxide is converted into sulphuric acid. A hopper 41 is mounted on top of a furnace 4 for use in introducing the charge into the furnace.

In operation I preferably have the bottom of the furnace 4 covered in a suitable manner with a layer of refractory material in the form of bricks, brick work or simply irregular pieces of suitable size. A charge of sulphide ore containing either zinc or lead or both mixed with the necessary flux, which if lime is needed consists of quick lime, and not limestone, is then put in, and no fuel of any sort is put into the cupola; the production of carbon dioxide is thereby wholly avoided. This body of ore and flux rests on the refractory material, previously introduced. I use this layer of refractory material to obtain a larger area of contact, and more perfect intermingling than would be otherwise possible, of the mixture of superheated steam and air with the slag or slag and fused, but not fully oxidized ore, as it runs over and trickles down through the interspaces in the layer of refractory material. The oxidation of the zinc and lead is thereby rendered more complete, and the percent. of loss in the slag of less volatile zinc oxide greatly reduced.

The mixture of superheated steam and air at about 2000° Fah. is then admitted from one of the accumulators, say 1, and passes through the pipe 5, through the pipe 6<sup>b</sup> into the flue 7 enters the cupola through the openings 11 and 11<sup>a</sup> and is distributed through the refractory material and rises through the ore charge. When this superheated mixture of steam and air meets the ore—already preheated by the fumes and gases, that have passed through it before,—a lively combustion (oxidation) of the sulphur, zinc, lead and other metals accompanying or forming the impurities of the ore, takes place by which a considerable elevation of temperature results, which causes the volatilization of the formed volatile oxy-combinations. By regulating the temperature of the steam and air, and the proportions of each, I can vary the composition of the final pigment produced. The volatilized oxides, sulphates and the gases will rise and pass out of the cupola and down the flue 13 into the middle compartment of the chamber 14 where they will expand, and cool and will come in contact with the outer surface of the pipes 17, which will cause the mechanical impurities, such as ore dust, to be percipitated to the bottom of the chamber. From the chamber 14 the fumes and gases will pass through the three series 22, 24 and 26 of cooling pipes and into the upper compartment 29 of the bag room 27.

From the compartment 29 the gases and fumes pass down into the bags 32. The fumes in the form of oxides and sulphates will be precipitated and retained by the bags 32; but the gases will pass through the bags into the middle compartment of the chamber 27, from whence they will escape via the pipe 33. A part of the whole of the gases consisting of sulphur dioxide and nitrogen from the compartment 30 after they are separated from the pigment are conveyed through the pipe 33 and forced by the blower through the pipe 34 into the compartment 15 and through heating pipes 19 to be reheated, and through the pipe 40<sup>a</sup> into the Glover acid tower 40 or any other suitable apparatus for the conversion of the sulphur dioxide into commercial sulphuric acid. Under certain conditions or according to the nature of the ore, a part of the mixture of sulphur dioxide and nitrogen from the pipe 33 is conveyed through the pipe 35 and forced by the blower through the pipe 35 and through the tuyeres 38 into the furnace 4, for the purpose of lowering and regulating the temperature above the oxidation zone in the furnace, so as to partially or fully prevent the fusing in that part of the furnace of the ore or any component part, of the same before it enters the oxidizing zone in the furnace. From the bags 32 the separated pigment passes into the hoppers 42 in compartment 31 from whence it is carried by a conveyer 43 to suitable kilns for driving off water, and other impurities, leaving a perfectly white pigment ready for market.

The different parts of the apparatus are provided with the necessary properly closed and protected openings and apertures for the purpose of inspection, withdrawal of samples of gases and fumes, taking of temperatures, testing of pressures, etc. By testing and analyzing the fumes and gases from different parts of the apparatus, besides observing and properly regulating the temperatures and pressures in different parts of the apparatus, the proper composition of the fumes and gases and favorable conditions for obtaining a desired and constant ultimate product, are easily regulated and maintained.

While I have particularly set forth the construction and combination of the different parts of an apparatus, which is well fitted to carry out my invention, the apparatus forms no part thereof, but is introduced only by way of illustration.

Having described my invention, what I claim as new and desire to secure by Letters Patent is:—

1. The process of producing oxide and sulphate of zinc and sulphate of lead which consists in forcing a superheated mixture of steam and air into a body of virgin ore containing zinc sulphide or lead sulphide or both, in a furnace, for the purpose and substantially as specified.

2. The process of producing a pigment from virgin ores containing zinc sulphide or lead sulphide or both, which consists in placing a layer of refractory material on the bottom of a furnace, charging the furnace with said ores, then forcing the superheated mixture of steam and air through the refractory material from beneath into the charge in said furnace, which ignites and oxidizes the sulphur, zinc and lead, then conveying the formed volatilized oxide and sulphates, together with the gases, out of the furnace, cooling the gases, the volatilized oxide and sulphates to a suitable temperature, and separating the condensed oxide and sulphates from the gases, substantially as specified.

3. The herein described process of treating virgin ores containing zinc sulphide or lead sulphide or both for the purpose of producing oxide of zinc, sulphates of zinc and lead and sulphuric acid, which consists in forcing a superheated mixture of steam and air into a body of such ore in a furnace, which ignites and oxidizes the sulphur, zinc and lead, the conveying the volatilized sulphates and oxide, together with the gases out of the furnace, cooling the gases, the volatilized oxide and sulphates to a suitable temperature, separating the condensed zinc oxide and zinc and lead sulphates from the gases, and finally conveying the separated gases, consisting of sulphur dioxide and nitrogen, into any suitable apparatus for the conversion of the sulphur dioxide into sulphuric acid, substantially as shown and specified.

4. The art of producing oxide and sulphate of zinc and sulphate of lead which consists in the one act or step of forcing a superheated mixture of steam and air into a body of virgin ore containing zinc sulphide or lead sulphide or both.

5. The art of treating virgin ores containing zinc sulphide or lead sulphide or both, and a quantity of quick lime, which consists in forcing a superheated mixture of steam and air therein.

6. The art of producing white pigments from virgin ores containing zinc sulphide or lead sulphide or both, which consists in charging a furnace with said ores, adding a quantity of quick lime to the charge of ores, and then forcing a superheated mixture of steam and air into the furnace.

In testimony whereof I have hereunto set my hand in presence of two subscribing witnesses.

JOHN THELBERG.

Witnesses:
HENRY W. WANDLESS,
E. S. SARGENT.